UNITED STATES PATENT OFFICE.

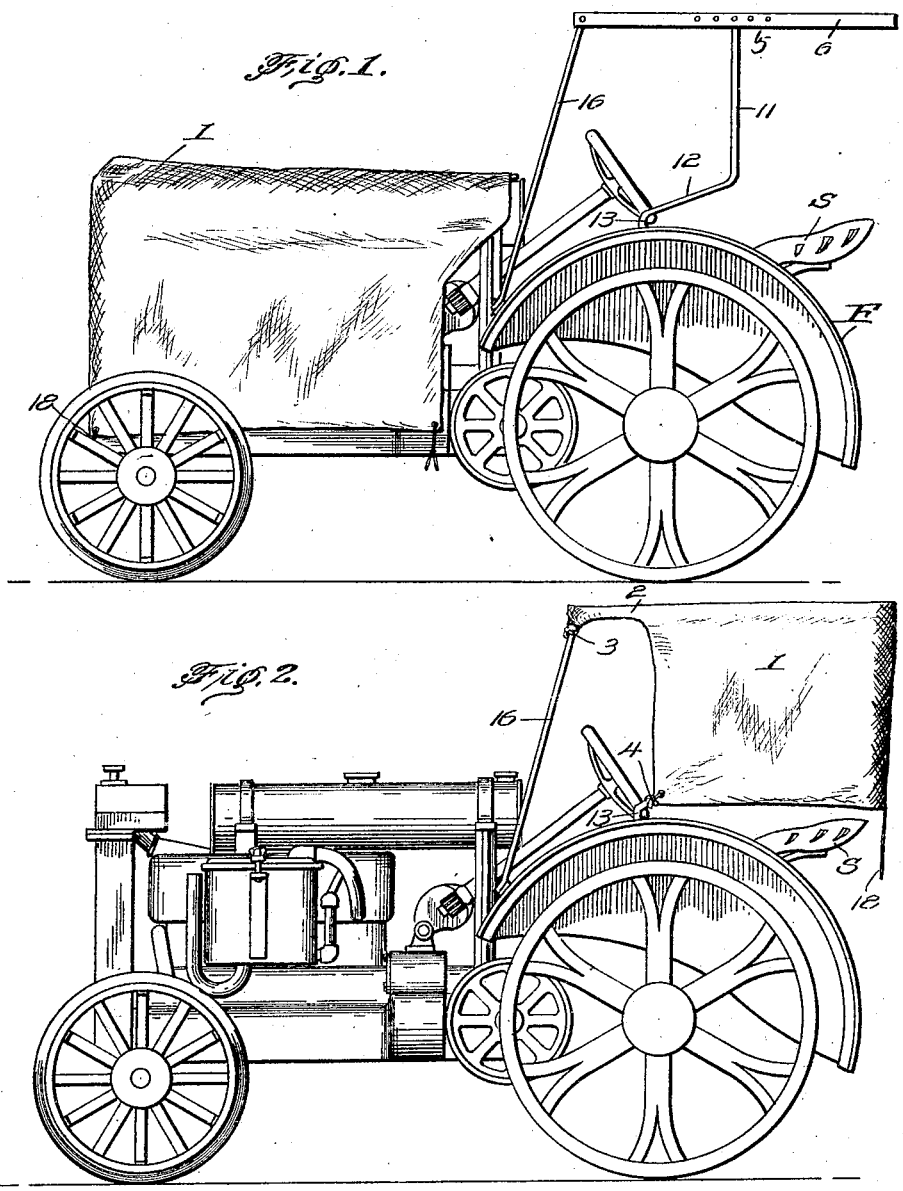

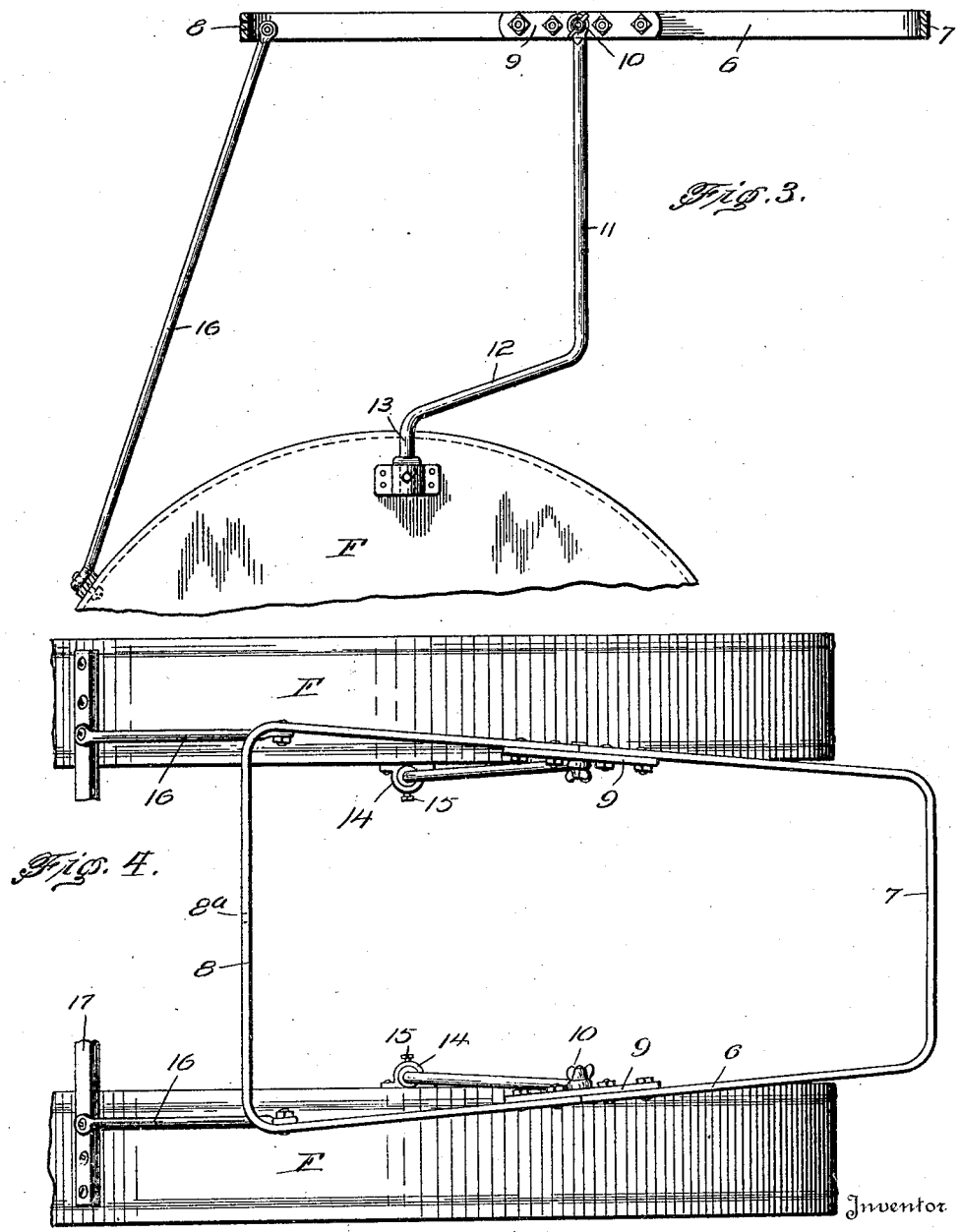

A. A. SUNDE, OF UTE, IOWA.

TRACTOR ATTACHMENT.

1,418,181. Specification of Letters Patent. Patented May 30, 1922.

Application filed July 15, 1921. Serial No. 484,952.

*To all whom it may concern:*

Be it known that I, A A SUNDE, a citizen of the United States, residing at Ute, in the county of Monona and State of Iowa, have invented certain new and useful Improvements in a Tractor Attachment, of which the following is a specification.

This invention relates to tractor attachments and more particularly to tops or weather protectors for the driver.

The object of the inventor is to provide a supporting frame to be mounted over the driver's seat and constructed for use in connection with the canvas engine hood, which is supplied with the tractor so that the same hood may be alternately used to protect the engine when the tractor is not in use and the driver when it is in use.

Another object is to so construct and mount a frame of this character that all forward and backward vibration are overcome and side vibration reduced to a minimum.

Another object is to so form the frame that the canvas engine hood may be quickly removed from the engine or motor and slipped onto the top frame in less time than it could be unfolded from a bundle, the canvas being thus always retained in stretched condition giving it a chance to dry and preventing it from becoming damaged which is liable to happen when it is carried on the tractor in a bundle.

The application of this attachment requires no alteration in either the hood or the tractor except the lengthening of the bolts which connect the front braces to the fender.

With these and other objects in view, the invention consists in certain novel features of construction as hereinafter shown and described and then specifically pointed out in the claims.

In the accompanying drawings:—

Figure 1 represents a side elevation of the front portion of a tractor with this impoved attachment shown applied, and with the canvas engine hood in position over the engine, Fig. 2 is a similar view showing the canvas hood removed from the engine and applied to the frame to provide a protective covering for the driver, Fig. 3 is an enlarged longitudinal section of the attachment, and, Fig. 4 is a plan view thereof, shown applied with the fenders broken off for convenience in illustration.

In the embodiment illustrated, a tractor is shown, equipped with a canvas hood or cover 1 for the engine shaped to conform to the shape of the engine and to fit snugly thereover, said hood having a rearwardly extending apron 2 at the rear upper portion thereof to fit over the rear portion of the gasoline tank, said cover or hood being equipped with a plurality of ropes or strings for securing it in position, As shown the apron 2 has ropes 3 at its corners and the lower rear corners of the hood proper are provided with ropes 4 adapted to be tied to any stationary part of the tractor to prevent the cover from blowing off. This canvas hood or cover 1 is supplied by the manufacturer with the tractor and is intended for use when the tractor is left standing in the field over night, or when stored in a garage and not in use, it being removed when the tractor is used, so that the engine may be properly cooled by the surrounding atmosphere.

The attachment constituting this invention comprises a frame 5 supported over the seat S of the driver.

This frame 5 which is intended as a support for the hood 1 when the tractor is in use, is composed of edgewise disposed strap iron including side bars 6 which converge toward their rear ends and are connected by a cross bar 7, a similar cross bar 8 connecting their front ends, the widened front portion of the frame extending some distance in advance of the driver's seat so that when the hood is mounted thereon, protection for the driver against the sun will be provided.

This horizontally disposed frame 5 is mounted on substantially L-shaped rods secured to the fenders F of the tractor, the vertical upright portions 11 of which are detachably connected with the side bars 6 of the frame 5, wing nuts 10 being here shown for securing the bolts which connect said rods 11 to the side members 6 of the frame. The shorter arms 12 of these uprights are inclined downwardly and forwardly and provided at their terminals with right angular depending extensions 13 detachably mounted in sockets 14 carried by the fenders F and secured by set screws 15 to facilitate removal of the attachment when desired.

Front brace rods 16 are secured at one end to the front portions of the side bars 6 and at their other ends are connected with a cross brace 17 which connects the front portions of the fenders F. These rods 16 as shown have eyes at their opposite ends for receiving the connecting bolts to adapt them to be detached when desired and they operate to effectively brace the front portion of the frame 5 and to avoid all backward and forward vibration and the angled supporting rods which connect the side bars with the fenders operate to reduce the side vibration of the frame to a minimum.

It will thus be seen that this frame is composed of a minimum number of parts and yet is sufficiently strong to effectively support a suitable covering which is intended to be the engine hood cover 1, the frame being shaped to correspond to the shape of this hood so that it may be readily slipped off the engine and applied to the frame in a few minutes, the apron 2 of said hood extending over the front portion of the frame and secured to the front brace rods 16 at their upper portions by the tie ropes 3. By so mounting this hood on the frame, the apron affords protection for the eyes of the driver and yet his side view is not interfered with, as is shown clearly in Fig. 2.

When this cover 1 is to be used only to protect the driver against the sun's rays the side portions of the hood may be turned up over the top of the frame and secured by tying thereby permitting the breeze to pass freely around the driver and yet protect him against the sun overhead.

When the hood is turned up, to permit the admission of breeze to the driver, the ropes 18, which are carried by the lower front corners of the hood 1 are brought forward and tied to the wing nuts 10.

From the above description it will thus be seen that the canvas hood cover 1 may be alternately used to protect either the engine or the driver, the frame 5 being so constructed that said hood will readily slip on and off with a minimum amount of exertion and the consumption of a very little time.

The use of this hood 1 as a cover for the driver not only avoids the necessity of furnishing a separate cover for this purpose, but is an advantage to the hood 1, keeping the canvas thereof always stretched tight and permitting it to dry out instead of it being rolled up in a damp bundle and suspended from some part of the tractor.

The preferred embodiment of the invention is disclosed in the drawings and set forth in the specification, but it will be understood that any modifications within the scope of the claimed invention may be made in the construction without departing from the principle of the invention or sacrificing any of its advantages.

I claim:—

1. The combination with a tractor having a canvas engine hood; of a top frame carried by the tractor and shaped to conform to the shape of the hood, said hood being usable alternately on the engine or the frame as a protector for the engine or the driver.

2. The combination with a tractor having a canvas engine hood; of a top frame carried by the tractor and comprising a horizontally disposed skeleton member shaped to conform to the shape of the hood, and front brace members and angled supporting rods carried by said frame and adapted to be attached to the tractor, said hood being usable alternately on the engine or the frame and equipped with means for securing it to either.

3. An attachment of the class described comprising a horizontally disposed frame including side and end members, said sides converging toward their rear and connected by one of said end members with substantially L-shaped angle rods secured to and depending from said side members intermediate the ends thereof and provided with rightangular terminals for attachment to the tractor fender and forwardly inclined brace rods carried by the front portion of said frame for connection with the tractor fender.

4. An attachment of the class described comprising a horizontally disposed frame substantially rectangular in form being wider at one end than the other to adapt it to conform to the shape of a tractor engine hood, a brace bar for connecting the fenders of a tractor, forwardly inclined brace rods connecting said bar with the front portion of said frame, and angle rods connecting said frame intermediate its ends with the fenders of the tractor.

In testimony whereof, I affix my signature hereto.

A A SUNDE.